United States Patent
Hayashi

(10) Patent No.: US 9,092,141 B2
(45) Date of Patent: Jul. 28, 2015

(54) METHOD AND APPARATUS TO MANAGE DATA LOCATION

(75) Inventor: Shinichi Hayashi, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 144 days.

(21) Appl. No.: 13/449,540

(22) Filed: Apr. 18, 2012

(65) Prior Publication Data

US 2013/0282982 A1   Oct. 24, 2013

(51) Int. Cl.
G06F 12/08 (2006.01)
G06F 12/00 (2006.01)
G06F 12/02 (2006.01)
G06F 3/06 (2006.01)

(52) U.S. Cl.
CPC .............. *G06F 3/061* (2013.01); *G06F 3/0631* (2013.01); *G06F 3/0685* (2013.01)

(58) Field of Classification Search
CPC ..... G06F 12/08; G06F 12/0802; G06F 12/00; G06F 12/0866; G06F 12/02
USPC ........................... 711/165, 118; 707/603, 814
See application file for complete search history.

(56) References Cited

U.S. PATENT DOCUMENTS

| | | | | |
|---|---|---|---|---|
| 8,429,346 | B1 * | 4/2013 | Chen et al. | 711/114 |
| 2006/0047909 | A1 * | 3/2006 | Takahashi et al. | 711/114 |
| 2007/0055713 | A1 | 3/2007 | Nagai et al. | |
| 2009/0144496 | A1 | 6/2009 | Kawaguchi | |
| 2010/0077168 | A1 * | 3/2010 | Arakawa | 711/165 |
| 2010/0199036 | A1 * | 8/2010 | Siewert et al. | 711/112 |
| 2010/0274827 | A1 * | 10/2010 | Hix et al. | 707/813 |
| 2010/0281230 | A1 * | 11/2010 | Rabii et al. | 711/165 |
| 2011/0010514 | A1 * | 1/2011 | Benhase et al. | 711/162 |
| 2011/0066802 | A1 * | 3/2011 | Kawaguchi | 711/114 |
| 2011/0082988 | A1 * | 4/2011 | Kono et al. | 711/161 |
| 2011/0202705 | A1 | 8/2011 | Hayashi | |
| 2013/0024650 | A1 * | 1/2013 | Ambat et al. | 711/209 |

OTHER PUBLICATIONS

Dell Compellent, "The Architectural Advantages of Dell Compellent Automated Tiered Storage", Feb. 2011, Dell Technical White Paper, pp. 1-12.*

* cited by examiner

*Primary Examiner* — Cheng-Yuan Tseng
*Assistant Examiner* — Kamal K Dewan
(74) *Attorney, Agent, or Firm* — Mattingly & Malur, PC

(57) ABSTRACT

Exemplary embodiments provide a management server that controls a storage subsystem based on the cache status on a server. In accordance with one aspect, a system comprises: a storage system operable to couple to a server and to manage a plurality of storage tiers, each of the plurality of storage tiers operable to store data sent from the server; and a management computer operable to manage a storage tier of the plurality of storage tiers for storing data based on whether the data is stored in a cache memory in the server or not.

20 Claims, 39 Drawing Sheets

OBJECT LOCATION INFORMATION ~403

| OBJECT NAME ~701 | OBJECT ADDRESS ~702 | VOLUME NAME ~703 | VOLUME ADDRESS ~704 |
|---|---|---|---|
| OBJECT A | 0 - 15 | VOL B | 0 - 15 ~705 |
| OBJECT B | 16 - 31 | VOL D | 16 - 31 ~706 |

Fig. 7

RAID GROUP INFORMATION ~502

| RAID GROUP NAME ~801 | MEDIA NAME ~802 | RAID LEVEL ~803 | MEDIA TYPE ~804 | CAPACITY ~805 |
|---|---|---|---|---|
| RG A | SSD A, SSD B, SSD C | RAID 5 | SSD SLC | 10 GB | ~806
| RG B | HDD A, HDD B, HDD C | RAID 5 | HDD SAS 15,000 rpm | 30 GB | ~807
| RG C | HDD D, HDD E, HDD F | RAID 5 | HDD SATA 7,200 rpm | 50 GB | ~808

Fig. 8

| LOGICAL VOLUME INFORMATION | | | |
|---|---|---|---|
| LOGICAL VOLUME NAME 901 | LOGICAL VOLUME ADDRESS 902 | RAID GROUP NAME 903 | RAID GROUP ADDRESS 904 |
| L-VOL A | 0 - 19 | RG A | 0 - 19 |
| L-VOL B | 0 - 99 | RG B | 0 - 99 |
| L-VOL C | 0 - 299 | RG C | 0 - 299 |

STORAGE POOL INFORMATION — 504

| STORAGE NAME (1001) | STORAGE POOL NAME (1002) | LOGICAL VOLUME NAME (1003) | VIRTUAL VOLUME NAME (1004) | POOL CAPACITY (1005) | USED POOL AMOUNT (1006) |
|---|---|---|---|---|---|
| STORAGE A | POOL A | L-VOL A, L-VOL B, L-VOL C | VOL A, VOL B | 80 GB | 60 GB |
| STORAGE A | POOL B | L-VOL D, L-VOL E | VOL C | 100 GB | 60 GB |

(1007, 1008)

VIRTUAL VOLUME INFORMATION

| VIRTUAL VOLUME PAGE NUMBER ~1101 | VIRTUAL VOLUME NAME ~1102 | VIRTUAL VOLUME ADDRESS ~1103 | LOGICAL VOLUME PAGE NUMBER ~1104 | LOGICAL VOLUME NAME ~1105 | LOGICAL VOLUME ADDRESS ~1106 | NUMBER OF ACCESS ~1107 | PINNED ~1108 |
|---|---|---|---|---|---|---|---|
| PAGE 0 | VOL A | 0 - 9 | PAGE 100 | L-VOL A | 0 - 9 | 100 | X ~1109 |
| PAGE 1 | VOL A | 10 - 19 | PAGE 101 | L-VOL A | 10 - 19 | 40 | X ~1110 |
| PAGE 2 | VOL A | 20 - 29 | PAGE 102 | L-VOL A | 20 - 29 | 50 | ~1111 |
| PAGE 3 | VOL A | 30 - 39 | PAGE 200 | L-VOL B | 0 - 9 | 80 | ~1112 |
| PAGE 4 | VOL A | 40 - 49 | PAGE 300 | L-VOL C | 0 - 9 | 3 | ~1113 |

Fig. 11

| 506 | TIER DEFINITION INFORMATION | | | | |
|---|---|---|---|---|---|
| | 1201 1202 | 1203 | 1204 | 1205 | |
| TIER | MEDIA TYPE | COMPRESSION | DEDUPLICATION | DEFAULT TIER | |
| 1 | SSD SLC | | | | ← 1206 |
| 2 | HDD SAS 15,000 rpm | | | x | ← 1207 |
| 3 | HDD SATA 7,200 rpm | | | | ← 1208 |
| 4 | HDD SATA 7,200 rpm | x | | | ← 1209 |
| 5 | HDD SATA 7,200 rpm | x | x | | ← 1210 |

Fig. 12

OBJECT LOCATION POLICY INFORMATION

| OBJECT NAME | DATA LOCATION |
|---|---|
| OBJECT A | SERVER FLASH & TIER 3 |
| OBJECT B | TIER 1 |
| OBJECT C | AUTO |

Fig. 13

| COMMAND TYPE | OBJECT NAME | FLASH CACHE |
|---|---|---|
| FLASH CACHE | OBJECT A | ON |
| | OBJECT B | OFF |

Fig. 17

| COMMAND TYPE | PAGE NAME | TIER | CACHE |
|---|---|---|---|
| PAGE PIN | PAGE 1, PAGE 3 | TIER 3 | NO |
| | PAGE 2, PAGE 4 | AUTO | YES |

PAGE PIN COMMAND

Fig. 19

OBJECT PERFORMANCE INFORMATION ~2301

| OBJECT NAME ~2501 | OBJECT SIZE ~2502 | NUMBER OF I/O ~2503 | I/O PER OBJECT SIZE ~2504 |
|---|---|---|---|
| OBJECT A | 5 GB | 1000 | 200 |
| OBJECT B | 10 GB | 500 | 50 |
| OBJECT C | 20 GB | 100 | 5 |

Rows reference markers: ~2505, ~2506, ~2507

Fig. 25

MEDIA CAPACITY INFORMATION — 2401, 2602

| MEDIA NAME (2601) | CAPACITY (2602) |
|---|---|
| TIER 1 | 10 GB | (2603)
| TIER 2 | 30 GB | (2604)
| TIER 3 | 60 GB | (2605)
| SERVER FLASH | 5 GB | (2606)

Fig. 26

PROGRAM ACCESS INFORMATION ~2801

| PROGRAM NAME ~3001 | VOLUME NAME ~3002 | VOLUME ADDRESS ~3003 |
|---|---|---|
| PROGRAM A | VOL A | 0 - 99, 200 - 299 ~3004 |
| PROGRAM B | VOL A | 100 - 199 ~3005 |
| PROGRAM C | VOL B | 0 - 99 ~3006 |

Fig. 30

| PROGRAM DATA LOCATION POLICY INFORMATION ~2901 | |
|---|---|
| PROGRAM NAME ~3101 | DATA LOCATION ~3102 |
| PROGRAM A | SERVER FLASH & TIER 3 ~3103 |
| PROGRAM B | TIER 1 ~3104 |
| PROGRAM B | AUTO ~3105 |

| PROGRAM NAME | DATA LOCATION |
|---|---|
| PROGRAM A | SERVER FLASH |
| PROGRAM B | TIER 1 |
| PROGRAM C | AUTO |

PROGRAM DATA LOCATION POLICY INFORMATION INPUT SCREEN (2902)

3201, 3202, 3203 (OK), 3204 (CANCEL)

3503 PAGE LOCATION MANAGEMENT INFORMATION

| PAGE NUMBER 3601 | NUMBER OF ACCESS FOR 24 HOURS 3602 | MINIMUM DATA LOCATION 3603 | NUMBER OF ACCESS FOR 1 HOUR 3604 | DATA LOCATION 3605 |
|---|---|---|---|---|
| PAGE 0 | 3000 | SERVER FLASH | 30 | SERVER FLASH ~3606 |
| PAGE 1 | 1500 | TIER 1 | 100 | SERVER FLASH ~3607 |
| PAGE 2 | 800 | TIER 2 | 10 | TIER 1 ~3608 |
| PAGE 3 | 300 | TIER 2 | 60 | TIER 1 ~3609 |
| PAGE 4 | 200 | TIER 3 | 2 | TIER 2 ~3610 |
| PAGE 5 | 100 | TIER 3 | 1 | TIER 2 ~3611 |
| PAGE 6 | 50 | TIER 3 | 5 | TIER 2 ~3612 |
| PAGE 7 | 20 | TIER 3 | 1 | TIER 2 ~3613 |
| PAGE 8 | 10 | TIER 3 | 0 | TIER 3 ~3614 |
| PAGE 9 | 5 | TIER 3 | 0 | TIER 3 ~3615 |

Fig. 36

| COMMAND TYPE | PAGE NAME | FLASH CACHE |
|---|---|---|
| PAGE FLASH CACHE | PAGE 0 | ON |
| | PAGE 1 | OFF |

Fig. 37

| COMMAND TYPE | PAGE NAME | STATUS |
|---|---|---|
| PAGE FLASH CACHE REPLY | PAGE 0 | CACHED |
| | PAGE 1 | UNCACHED |

PAGE FLASH CACHE COMMAND REPLY

Fig. 38

METHOD AND APPARATUS TO MANAGE DATA LOCATION

BACKGROUND OF THE INVENTION

The present invention relates generally to tier management and, more particularly, to a method and an apparatus of data location management.

In recent years, thin provisioning has become popular. Thin provisioning is a method for allocating area for a storage system that receives a write command to an unallocated area and allocates physical devices in response to the write commands. Storage systems may also reallocate frequently accessed allocated area to fast and expensive media and rarely accessed allocated area to slow and cheap media. Generally, when a storage system receives a write command to an unallocated area, the storage system allocates a default tier area to the unallocated area.

An application program uses flash memory drive on server as a cache in order to increase performance. The application program reads data from the flash memory drive instead of the storage subsystem if there is the data on the flash memory drive and writes the data to the flash memory drive and the storage subsystem. However, there is flash memory device on the storage subsystem and frequently written areas in storage subsystem are moved to a higher tier that is the flash memory device. Therefore, the frequently written areas are located on the flash memory drive on the server and the flash memory device on the storage subsystem. Further, frequently accessed areas cannot be moved to a higher tier and performance will decrease.

According to US2011/0202705, an administrator can locate a specified volume to a specified tier. However, the storage subsystem cannot know whether a volume copy command from the management server is for deploy or backup. Therefore, the storage subsystem cannot locate the volume to an applicable tier. According to US2009/0144496 A1, the storage controller can compress virtual volumes by a page.

BRIEF SUMMARY OF THE INVENTION

Exemplary embodiments of the invention provide a management server that controls a storage subsystem based on the cache status on a server. The management server commands the server to cache data, checks the cache status of the data, and commands the storage subsystem to pin the data to a lower tier. As a result, other objects that have many write accesses can be located on a higher tier.

In a first embodiment, an administrator specifies the location of objects and the objects are moved. The management server commands the server to cache objects, checks the cache status of the objects, and commands the storage subsystem to pin the objects to a lower tier based on object location information from the server.

In a second embodiment, objects are moved based on the number of access to the objects. The management server gets object performance information from the server, decides the location of objects based on the number of access to the objects, commands the server to cache the objects, checks the status, and commands the storage subsystem to pin the objects to a lower tier.

In a third embodiment, data is moved by a program that accesses the data. The management server commands the server to cache data that is accessed by the program, checks the cache status of the data, and command the storage subsystem to pin the data to a lower tier.

In a fourth embodiment, pages are moved based on the number of access to the pages. The management server gets several page performance information regarding pages for which the measurement cycle is different from the storage subsystem, decides the location of pages based on the number of access to the pages for which the measurement cycle is different, commands the server to cache the pages, checks the status, and commands the storage subsystem to pin the pages to a lower tier.

In accordance with an aspect of the present invention, a system comprises: a storage system operable to couple to a server and to manage a plurality of storage tiers, each of the plurality of storage tiers operable to store data sent from the server; and a management computer operable to manage a storage tier of the plurality of storage tiers for storing data based on whether the data is stored in a cache memory in the server or not.

In some embodiments, the storage system comprises a storage controller to manage storage of a data at a location selected among the plurality of storage tiers based on a location policy for the data. The plurality of storage tiers include a lower tier and a higher tier, and the higher tier has higher speed storage media than the lower tier. The management computer is operable to manage storage of data in the storage system such that, if a data is stored in a cache memory of the server, the data is to be stored in the lower tier of the storage system. The storage system is configured to manage the plurality of storage tiers for storing data objects, and the management computer is configured to manage storage of data objects in the storage system such that, if data of a data object is stored in a cache memory of the server, the data object is to be stored in the lower tier of the storage system.

In specific embodiments, the management computer is operable, if a data is stored in the cache memory of the server, to pin the data to be stored in the lower tier of the storage system. The storage system comprises a storage controller which is configured, if a data is not stored in the cache memory of the server, to manage storage of the data at a location selected among the plurality of storage tiers based on a preset location policy for the data. The storage system is configured to manage the plurality of storage tiers for storing data objects. The management computer is operable, if a data object is stored in the cache memory of the server, to pin the data object to be stored in the lower tier of the storage system. The storage system comprises a storage controller which is configured, if a data object is not stored in the cache memory of the server, to manage storage of the data object at a location selected among the plurality of storage tiers based on a number of access to the data object.

In some embodiments, the management computer is operable, if a data is stored in the cache memory of the server, to pin the data to be stored in the lower tier of the storage system. The storage system comprises a storage controller which is configured, if a data is not stored in the cache memory of the server, to manage storage of the data at a location selected among the plurality of storage tiers based on a program data location policy that specifies tier selection for data location depending upon which computer program of a plurality of computer programs accesses the data.

In specific embodiments, the storage system is configured to manage the plurality of storage tiers for storing data in volume pages. The management computer is operable, if a volume page is stored in the cache memory of the server, to pin the volume page to be stored in the lower tier of the storage system. The storage system comprises a storage controller which is configured, if a volume page is not stored in the cache memory of the server, to manage storage of the volume page at a location selected among the plurality of storage tiers based on a number of access to the volume page.

Another aspect of the invention is directed to a management computer for managing storage of data in a storage system which is coupled to a server and which manages a plurality of storage tiers, each of the plurality of storage tiers operable to store data sent from the server. The management computer comprises: a processor; a memory; and a module to manage a storage tier of the plurality of storage tiers for storing data based on whether the data is stored in a cache memory in the server or not.

In some embodiments, the module is configured to receive input of a location policy and to manage storage of a data in the storage system at a location selected among the plurality of storage tiers based on the location policy for the data. The module is configured to send a command to the server to check a status of the cache memory of the server and determine if any data that is to be stored in the storage system is stored in the cache memory. The plurality of storage tiers include a lower tier and a higher tier, and the higher tier has higher speed storage media than the lower tier, and the module is configured to manage storage of data in the storage system such that, if a data is stored in a cache memory of the server, the data is to be stored in the lower tier of the storage system. The module is configured to send a command to the storage system, if a data that is to be stored in the storage system is stored in the cache memory of the server, to store the data in the lower tier of the storage system.

Another aspect of this invention is directed to a computer-readable storage medium storing a plurality of instructions for controlling a data processor to manage storage of data in a storage system which is coupled to a server and which manages a plurality of storage tiers, each of the plurality of storage tiers operable to store data sent from the server. The plurality of instructions comprise instructions that cause the data processor to manage a storage tier of the plurality of storage tiers for storing data based on whether the data is stored in a cache memory in the server or not.

In some embodiments, the plurality of instructions further comprise: instructions that cause the data processor to provide a user interface to receive input of a location policy; and instructions that cause the data processor to manage storage of a data in the storage system at a location selected among the plurality of storage tiers based on the location policy for the data. The instructions that cause the data processor to manage a storage tier of the plurality of storage tiers for storing data comprise instructions that cause the data processor to manage storage of data in the storage system such that, if a data is stored in a cache memory of the server, the data is to be stored in the lower tier of the storage system.

In specific embodiments, the instructions that cause the data processor to manage storage of data in the storage system comprise: instructions that cause the data processor, if a data object is stored in the cache memory of the server, to pin the data object to be stored in the lower tier of the storage system; and instructions that cause the data processor, if a data object is not stored in the cache memory of the server, to manage storage of the data object at a location selected among the plurality of storage tiers based on a number of access to the data object.

In some embodiments, the instructions that cause the data processor to manage storage of data in the storage system comprise: instructions that cause the data processor, if a data is stored in the cache memory of the server, to pin the data to be stored in the lower tier of the storage system; and instructions that cause the data processor, if a data is not stored in the cache memory of the server, to manage storage of the data at a location selected among the plurality of storage tiers based on a program data location policy that specifies tier selection for data location depending upon which computer program of a plurality of computer programs accesses the data.

In specific embodiments, the data is stored in volume pages in the storage system, and the instructions that cause the data processor to manage storage of data in the storage system comprise: instructions that cause the data processor, if a volume page is stored in the cache memory of the server, to pin the volume page to be stored in the lower tier of the storage system; and instructions that cause the data processor, if a volume page is not stored in the cache memory of the server, to manage storage of the volume page at a location selected among the plurality of storage tiers based on a number of access to the volume page.

These and other features and advantages of the present invention will become apparent to those of ordinary skill in the art in view of the following detailed description of the specific embodiments.

BRIEF DESCRIPTION OF THE DRAWINGS

FIG. 7 shows an example of the object location information.

FIG. 8 shows an example of the RAID group information.

FIG. 9 shows an example of the logical volume information.

FIG. 10 shows an example of the storage pool information.

FIG. 11 shows an example of the virtual volume information.

FIG. 12 shows an example of the tier definition information.

FIG. 13 shows an example of the object location policy information in the first embodiment.

FIG. 17 shows an example of a flash cache command.

FIG. 19 shows an example of a page pin command.

FIG. 25 shows an example of the object performance information in the second embodiment.

FIG. 26 shows an example of the media capacity information in the second embodiment.

FIG. 30 shows an example of the program access information in the third embodiment.

FIG. 31 shows an example of the program data location policy information in the third embodiment.

FIG. 32 shows an example of the program data location policy information input screen in the third embodiment.

FIG. 36 shows an example of page location management information in the fourth embodiment.

FIG. 37 shows an example of a page flash cache command in the fourth embodiment.

FIG. 38 shows an example of a page flash cache command reply in the fourth embodiment.

DETAILED DESCRIPTION OF THE INVENTION

Figure 1:
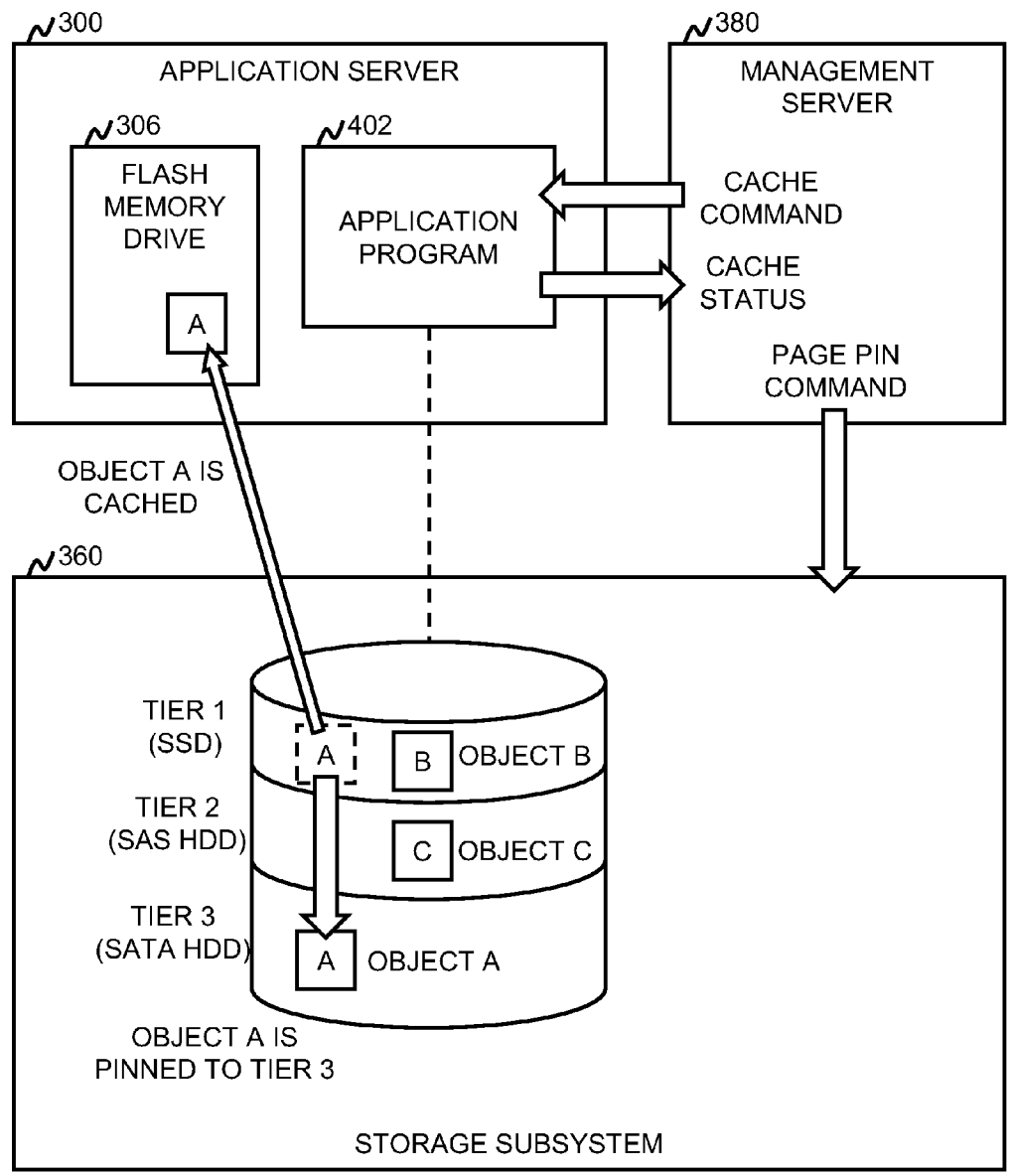
FIG. 1 shows an example of a storage system to illustrate an overview of data location management.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for data location management.

FIG. 1 shows an example of a storage system to illustrate an overview of data location management. The storage system includes an application server 300 having a flash memory drive 306 and an application program 402, a management server 380, and a storage subsystem 360 having tier 1 storage (SSD), tier 2 storage (SAS HDD) and tier 3 storage (SATA HDD). In FIG. 1, object A is cached on the flash memory drive 306 and pinned to tier 3. As such, object B can be located on tier 1. The management server 380 commands the server 300 to cache data (cache command arrow), checks the cache status of the data (cache status arrow), and commands the storage subsystem to pin the data to a lower tier (page pin command arrow). As a result, other objects that have many write accesses can be located on a higher tier.

Figure 2:
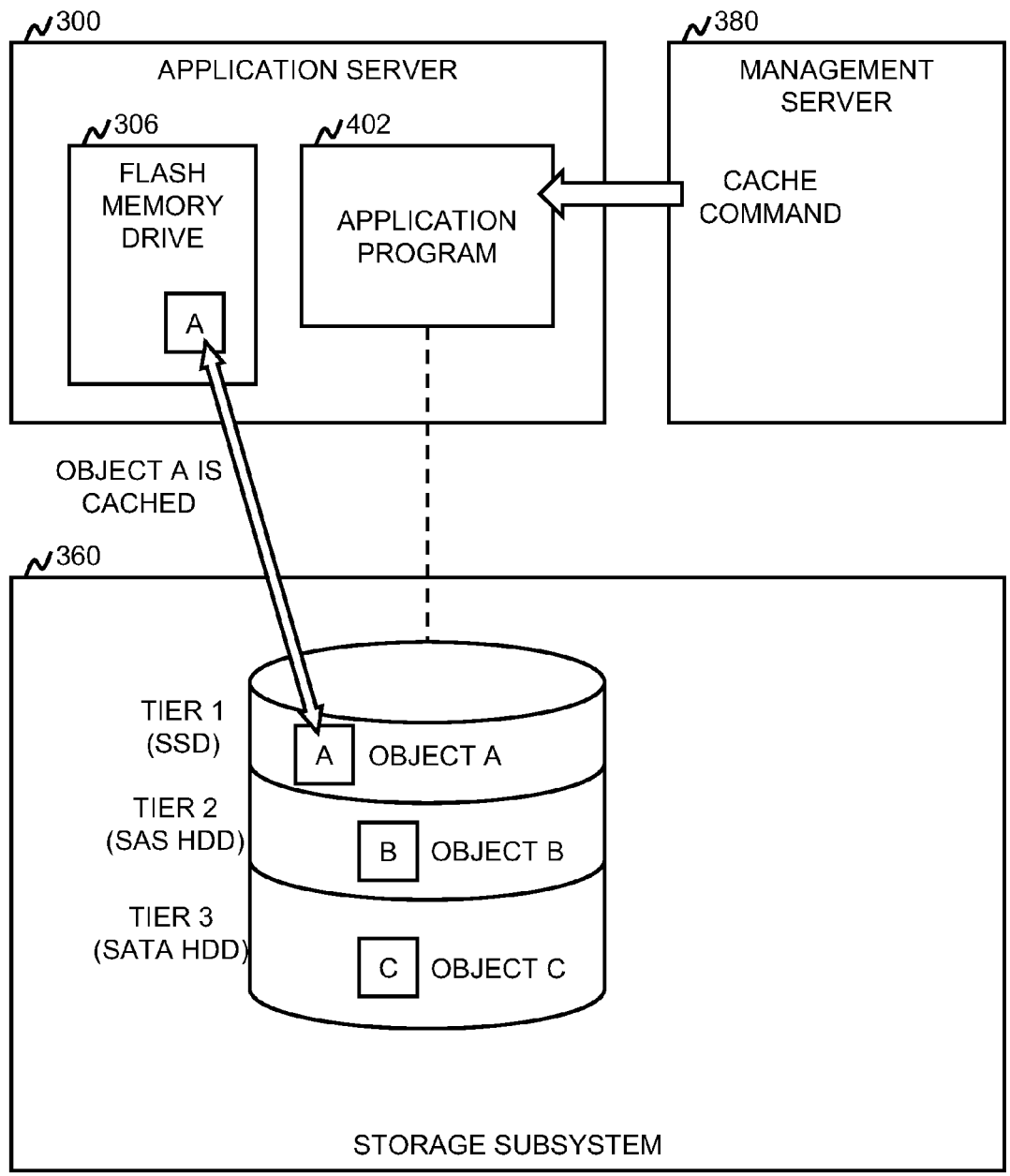
FIG. 2 shows the same storage system of FIG. 1 to illustrate a problem of the prior art.

FIG. 2 shows the same storage system of FIG. 1 to illustrate a problem of the prior art, in which object A is cached on the flash memory drive 306 and located on tier 1 that is SSD. Object B is located not on tier 1 but on tier 2 even though it has more accesses than object A. Therefore, frequently accessed areas cannot be moved to a higher tier and performance will decrease.

First Embodiment

A. System Configuration

Figure 3:
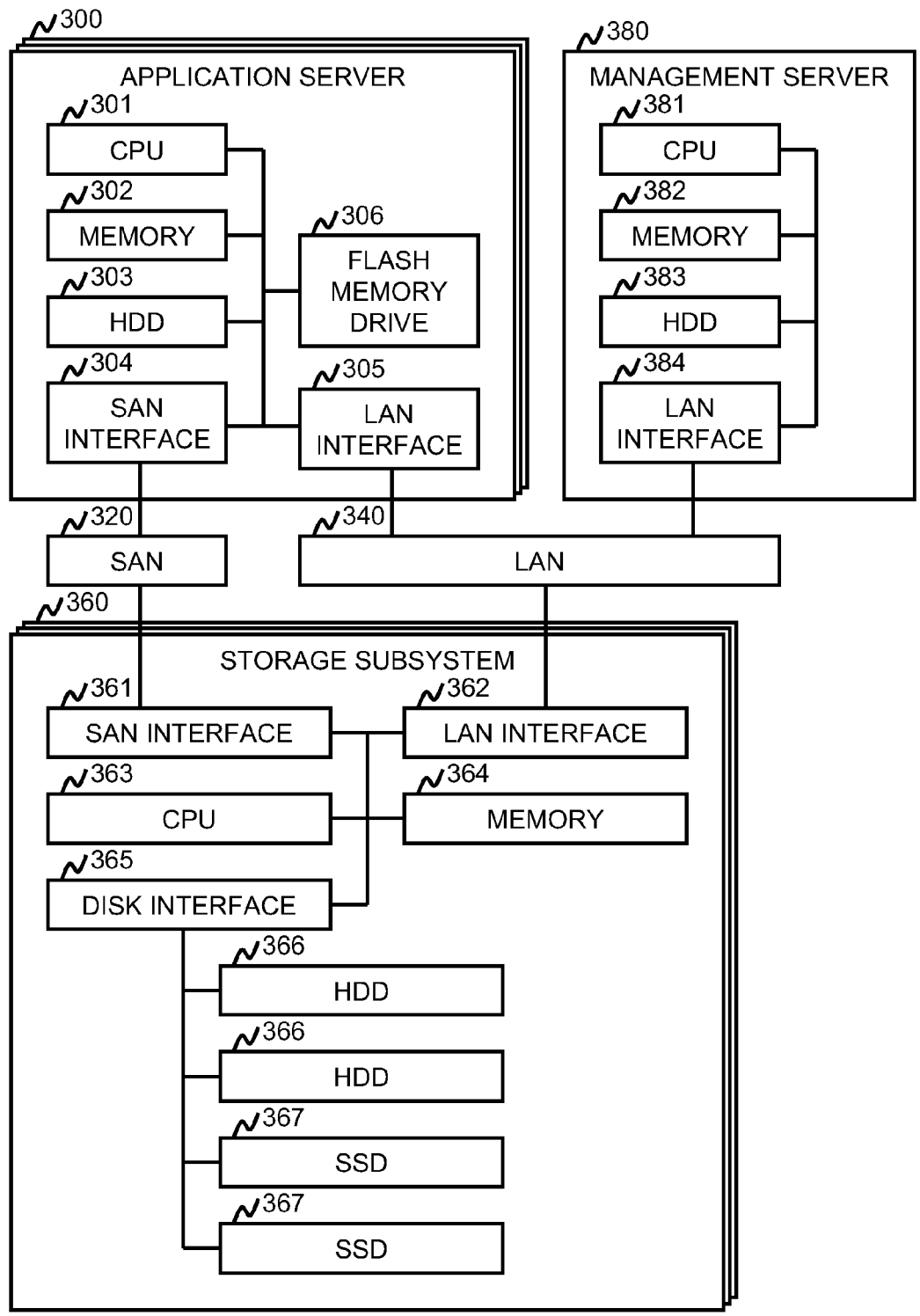
FIG. 3 illustrates an example of a hardware configuration of an information system in which the method and apparatus of the invention may be applied.

FIG. 3 illustrates an example of a hardware configuration of an information system in which the method and apparatus of the invention may be applied. The system comprises one or more application servers 300, a SAN (Storage Area Network) 320, a LAN (Local Area Network) 340, one or more storage subsystems 360, and a management server 380. The application server 300 comprises a CPU (Central Processing Unit) 301, a memory 302, a HDD (Hard Disk Drive) 303, a SAN interface 304, a LAN interface 305, and a flash memory drive 306. The CPU 301 reads programs from the memory 302 and executes the programs. The memory 302 reads programs and data from the HDD 303 when the application server 300 starts and stores the programs and the data. The HDD 303 stores programs and data. The SAN interface 304 connects the application server 300 and the SAN 320. The LAN interface 305 connects the application server 300 and the LAN 340. The flash memory drive 306 caches data. The SAN 320 connects the application server 300 and the storage subsystem 360. The application server 300 uses the SAN 320 to send application data to the storage subsystem 360 and receive application data from the storage subsystem 360. The application server 300, the storage subsystem 360, and the management server 380 use the LAN 340 to send management data and receive management data. The LAN 340 connects the application server 300, the storage subsystem 360, and the management server 380. The storage subsystem 360 comprises a SAN interface 361, a LAN interface 362, a CPU 363, a memory 364, a disk interface 365, a HDD 366, and a SSD (Solid State Drive) 367. The SAN interface 361 connects the storage subsystem 360 and the SAN 320. The LAN interface 362 connects the storage subsystem 360 and the LAN 340. The CPU 363 reads programs from the memory 364 and executes the programs. The memory 364 reads programs and data from the HDD 366 and the SSD 367 when the storage subsystem 360 starts and stores the programs and the data. The disk interface 365 connects the storage subsystem 360, the HDD 366, and the SSD 367. The HDD 366 stores programs and data. The SSD 367 stores programs and data. The management server 380 comprises a CPU 381, a memory 382, a HDD 383, and a LAN interface. The CPU 381 reads programs from the memory 382 and executes the programs. The memory 382 reads programs and data from the HDD 383 when the management server 380 starts and stores the programs and the data. The HDD 383 stores programs and data. The LAN interface 384 connects the management server 380 and the LAN 340.

Figure 4:
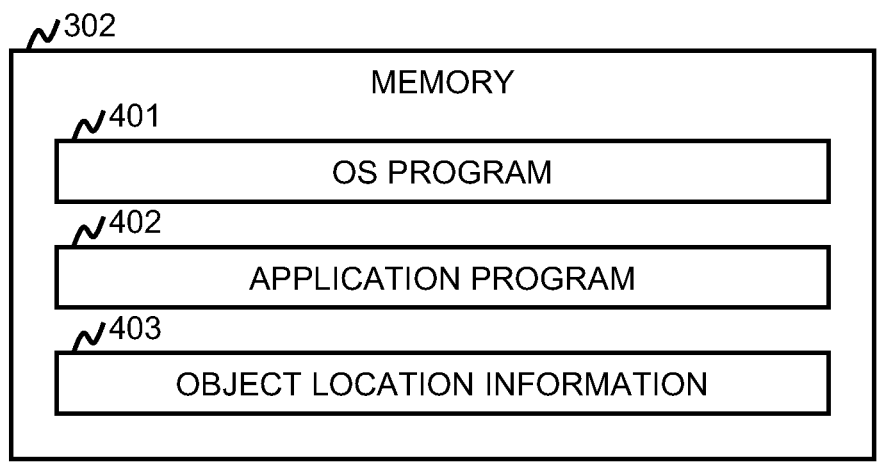
FIG. 4 illustrates an example of the memory in the application server of FIG. 3 according to a first embodiment.

FIG. 4 illustrates an example of the memory 302 in the application server 300 of FIG. 3 according to the first embodiment. The memory 302 comprises an OS (Operating System) program 401, an application program 402, and object location information 403. The OS program 401 executes the application program 402. The application program 402 (e.g., database program) sends a read command to the storage subsystem 360 to read data in the storage subsystem 360, process data, and write the results to the storage subsystem 360.

Figure 5:
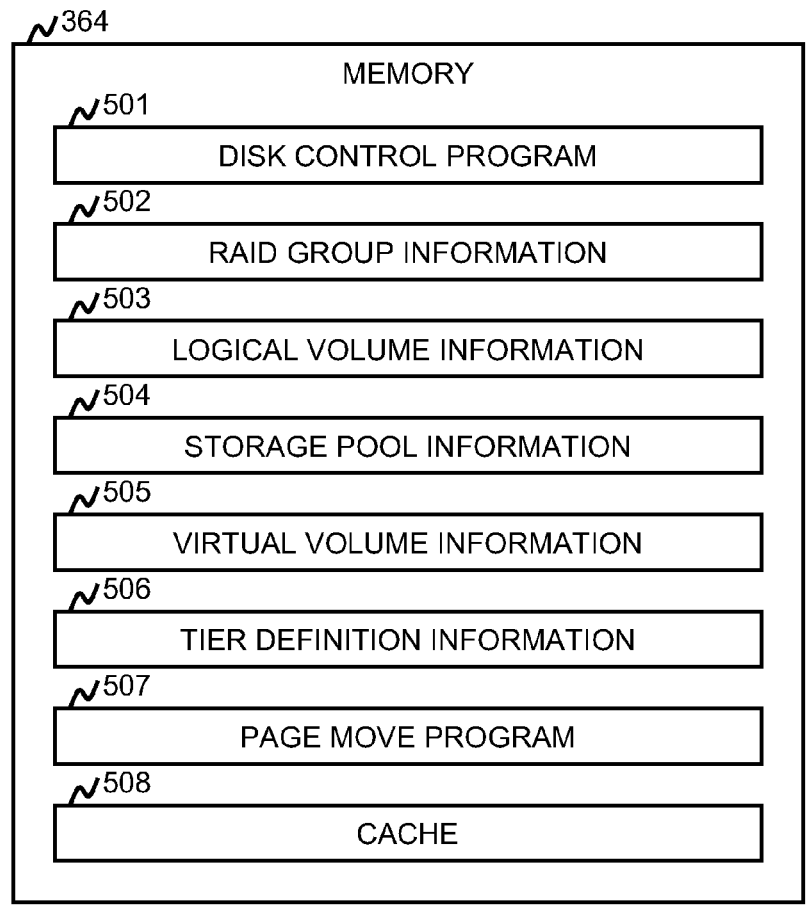
FIG. 5 illustrates an example of the memory in the storage subsystem of FIG. 3 according to the first embodiment.

FIG. 5 illustrates an example of the memory 364 in the storage subsystem 360 of FIG. 3 according to the first embodiment. The memory 364 comprises a disk control program 501, RAID (Redundant Arrays of Inexpensive (or Independent) Disks) group information 502, logical volume information 503, storage pool information 504, virtual volume information 505, tier definition information 506, a page move program 507, and a cache 508. The disk control program 501 receives a read command and a write command from the application server 300, reads data from the HDD 366 and the SSD 367, and writes data to the HDD 366 and the SSD 367 using the RAID group information 502, the logical volume information 503, the storage pool information 504, the virtual volume information 505, and the tier definition information 506. When the disk control program 501 reads data from the HDD 366 and the SSD 367, the disk control program 501 temporarily stores the data to the cache 508 and deletes old data on the cache 508. The disk control program 501 read data from the cache 508 instead of the HDD 366 and the SSD 367 if there is the data on the cache 508 when the disk control program 501 receives the read command from the application server 300.

Figure 6:
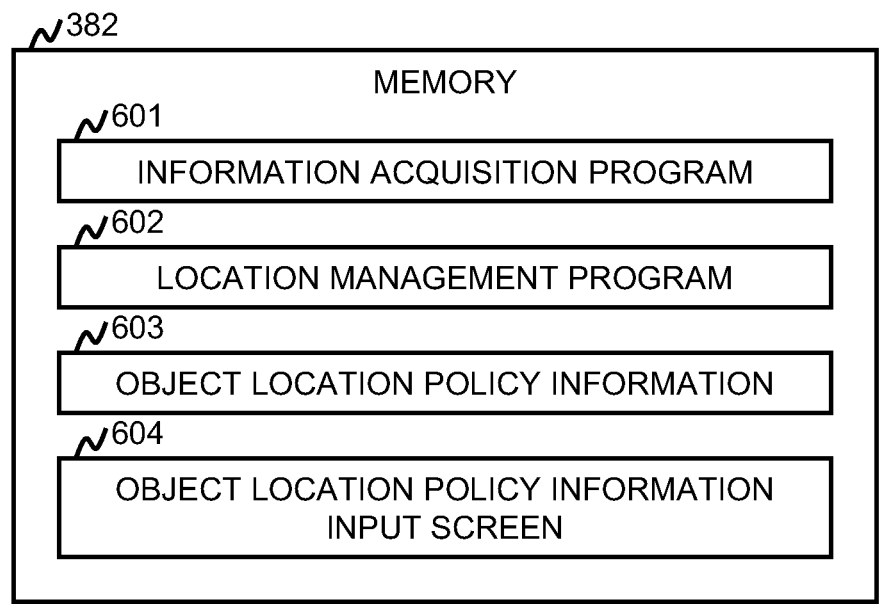
FIG. 6 illustrates an example of the memory in the management server of FIG. 3 according to the first embodiment.

FIG. 6 illustrates an example of the memory 382 in the management server 380 of FIG. 3 according to the first embodiment. The memory 382 comprises an information acquisition program 601, a location management program 602, object location policy information 603, and an object location policy information input screen 604.

FIG. 7 shows an example of the object location information 403. The object location information 403 includes columns of object name 701, object address 702, volume name 703, and volume address 704. The object location information 403 shows data in an area specified by the object name 701 and the object address 702 is stored on an area specified by the volume name 703 and the volume address 704.

FIG. 8 shows an example of the RAID group information 502. The RAID group information 502 includes columns of RAID group name 801, media name 802, RAID level 803, media type 804, and capacity 805. The RAID group name 801 shows the name of the RAID groups. The media name 802 shows the media that comprise the RAID group specified by the RAID group name 801. The RAID level 803 shows the RAID level of the RAID group specified by the RAID group name 801. The media type 804 shows the media type of the RAID group specified by the RAID group name 801. The capacity 805 shows the capacity of the RAID group specified by the RAID group name 801. Examples for RAID group RG A, RG B, and RG C are shown in rows 806, 807, and 808.

FIG. 9 shows an example of the logical volume information 503. The logical volume information 503 includes columns of logical volume name 901, logical volume address 902, RAID group name 903, and RAID group address 904. The area specified by the logical volume name 901 and the logical volume address 902 is mapped to the area specified by the RAID group name 903 and the RAID group address 904. Examples for logical volumes L-VOL A, L-VOL B, and L-VOL C are shown in rows 905, 906, and 907.

FIG. 10 shows an example of the storage pool information 504. The storage pool information 504 includes columns of storage name 1001, storage pool name 1002, logical volume name 1003, virtual volume name 1004, pool capacity 1005, and used pool amount 1006. The storage pool information 504 shows that the storage pool name 1002 is located on the storage subsystem specified by the storage name 1001, comprises the logical volumes specified by the logical volume name 1003, and has the virtual volumes specified by the virtual volume name 1004. The pool capacity 1005 shows the capacity of the storage pool specified by the storage pool name 1002. The used pool amount 1006 shows the used amount of the storage pool specified by the storage pool name 1002. Examples for Storage A and Storage B are shown in rows 1007 and 1008.

FIG. 11 shows an example of the virtual volume information 505. The virtual volume information 505 includes columns of virtual volume page number 1101, virtual volume name 1102, virtual volume address 1103, logical volume page number 1104, logical volume name 1105, logical volume address 1106, number of access 1107, and pinned 1108. The virtual volume page number 1101 shows the page specified by the virtual volume name 1102 and the virtual volume address 1103. The logical volume page number 1104 shows the page specified by the logical volume name 1105 and the logical volume address 1106. The page specified by the virtual volume page number 1101 is mapped to the page specified by the logical volume page number 1104. The number of access 1107 shows the number of access to the page specified by the virtual volume page number 1101. The column of pinned 1108 shows the status of whether the page specified by the virtual volume page number 1101 is pinned. If the pinned 1108 is "X", the page specified by the virtual volume page number 1101 is pinned and the page move program 507 does not move the page to another tier. Examples for virtual volume page numbers Page 0, Page 1, Page 2, Page 3, and Page 4 are shown in rows 1109, 1110, 1111, 1112, and 1113.

FIG. 12 shows an example of the tier definition information 506. The tier definition information 506 includes columns of tier 1201, media type 1202, compression 1203, deduplication 1204, and default tier 1205. The media type 1202 shows the media of the tier specified by the tier 1201. If the compression 1203 is "X," the disk control program 501 compresses data when the disk control program 501 writes the data to a logical volume and uncompresses data when the disk control program 501 reads the data from a logical volume. If the deduplication 1204 is "X," the disk control program 501 deduplicates data when the disk control program 501 writes the data to a logical volume and undeduplicates data when the disk control program 501 reads the data from a logical volume. "TIER 4" and "TIER 5" are the same media as "TIER 3," are slower than "TIER 3" because of the compression and uncompression processes, and can store bigger data than "TIER 3." If the default tier 1205 is "X," the tier specified by the tier 1201 is allocated to unallocated area by the disk control program 501. Examples for Tiers 1, 2, 3, 4, and 5 are shown in rows 1206, 1207, 1208, 1209, and 1210.

FIG. 13 shows an example of the object location policy information 603 in the first embodiment. The object location policy information 603 includes columns of object name 1301 and data location 1302. The data location 1302 shows a location of the object specified by the object name 1301. For example, if the data location 1302 is "AUTO," frequently accessed pages are moved to a higher tier and rarely accessed pages are moved to a lower tier. When the data location 1302 is not "AUTO," pages are pinned to the tier specified by the tier policy. If the data location 1302 is "SERVER FLASH & TIER 3," the object specified by the object name 1301 is cached on the flash memory drive 306 and located on the tier 3 in the storage subsystem 360. Examples for Object A, Object B, and Object C are shown in rows 1303, 1304, and 1305.

Figure 14:
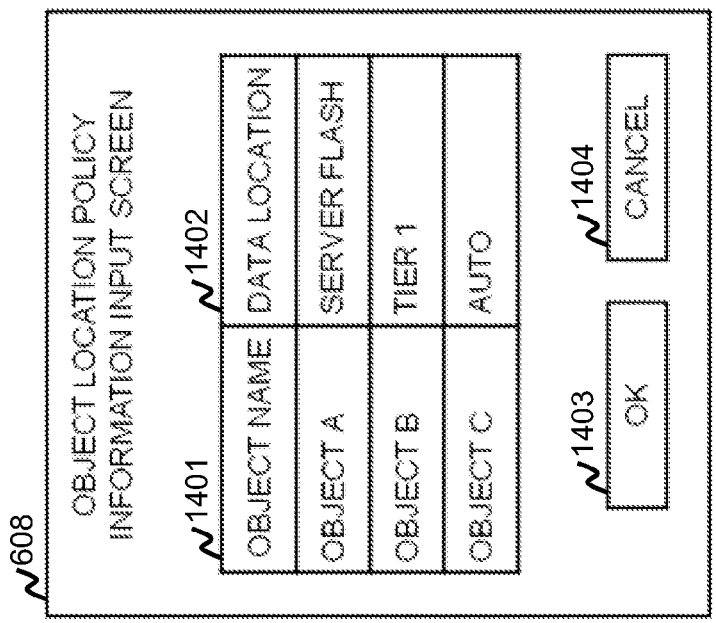
FIG. 14 shows an example of the object location policy information input screen in the first embodiment.

FIG. 14 shows an example of the object location policy information input screen 604 in the first embodiment. The object location policy information input screen 604, includes columns of object name 1401 and data location 1402, an OK button 1403, and a cancel button 1404. An administrator inputs the data location 1402 of the object specified by the object name 1401 and clicks the OK button 1403.

Figure 15:
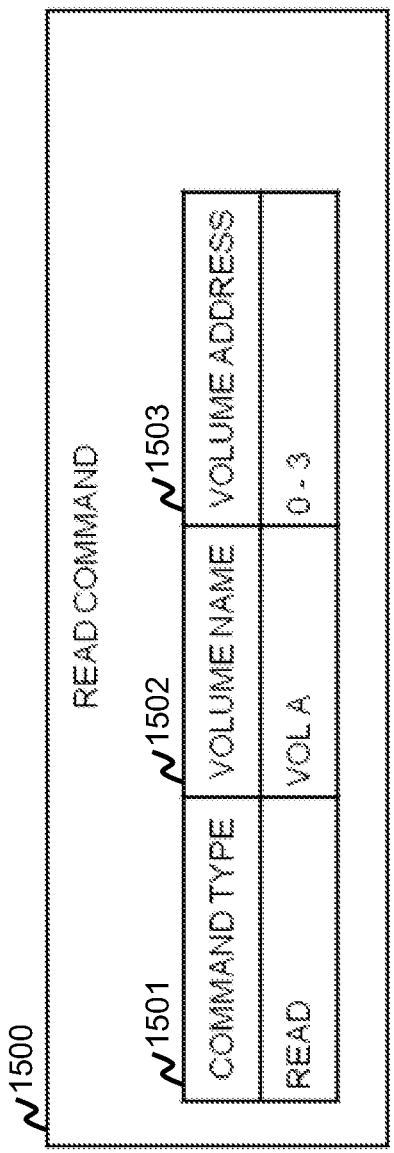
FIG. 15 shows an example of a read command.

FIG. 15 shows an example of a read command 1500. The read command 1500 includes command type 1501, volume name 1502, and volume address 1503. The application program 402 sends the read command 1500 to the storage subsystem 360 to read the area specified by the volume name 1502 and the volume address 1503.

Figure 16:
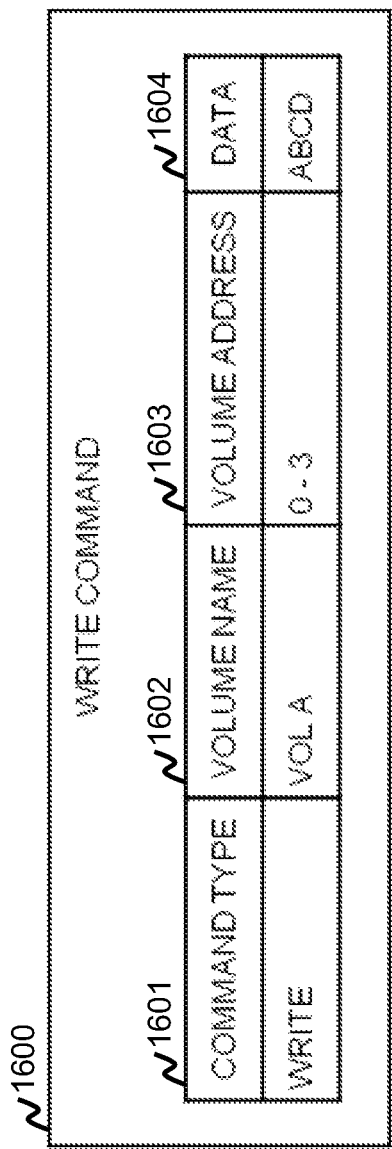
FIG. 16 shows an example of a write command.

FIG. 16 shows an example of a write command 1600. The write command 1600 includes command type 1601, volume name 1602, volume address 1603, and data 1604. The application program 402 sends the write command 1600 to the storage subsystem 360 to write the data specified by the data 1604 to the area specified by the volume name 1602 and the volume address 1603.

FIG. 17 shows an example of a flash cache command 1700. The flash cache command 1700 includes command type 1701, object name 1702, and flash cache 1703. The location management program 602 sends the flash cache command 1700 to the application server 300 to cache objects and uncache objects on the flash cache drive (flash memory drive) 306. If the flash cache 1703 is "ON," the application program 402 caches objects specified by the object name 1702 to the flash memory drive 306. If the flash cache 1703 is "OFF," the application program 402 releases objects specified by the object name 1702 from the flash memory drive 306.

Figure 18:
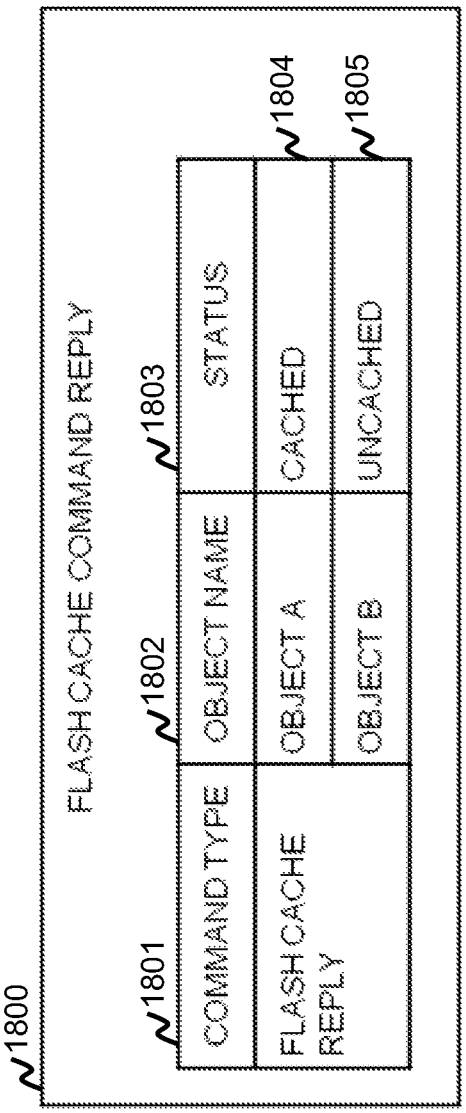
FIG. 18 shows an example of a flash cache command reply.

FIG. 18 shows an example of a flash cache command reply 1800. The flash cache command reply 1800 includes command type 1801, object name 1802, and status 1803. The application program 402 sends the flash cache command reply 1800 to the management server 380 to provide in reply the result of the flash cache command 1700. If the status 1803 is "CACHED," objects specified by the object name 1802 are cached on the flash memory drive 306. If the status 1803 is "UNCACHED," objects specified by the object name 1802 are not cached on the flash memory drive 306.

FIG. 19 shows an example of a page pin command 1900. The page pin command 1900 includes command type 1901, page name 1902, tier 1903, and cache 1904. The location management program 602 sends the page pin command 1900 to the storage subsystem 360 to pin objects to specified tiers and unpin objects. If the tier 1903 is "TIER 3," the pages specified by the page name 1902 are pinned to "TIER 3." If the tier 1903 is "AUTO," the pages specified by the page name 1902 is not pinned and is moved to applicable tier based on the number of I/O to the pages. If the cache 1904 is "YES," the disk control program 501 caches data to the cache 508 when the disk control program 501 moves pages specified by the page name 1902 to a tier specified by the tier 1903. If the cache 1904 is "NO," the disk control program 501 does not cache data to the cache 508 when the disk control program 501 moves pages specified by the page name 1902 to a tier specified by the tier 1903 because an object is already cached on the flash memory drive 306 on the application server 300 and there is no read command 1500 to pages that store the object from the application server 300.

B. Process Flows

Figure 20:
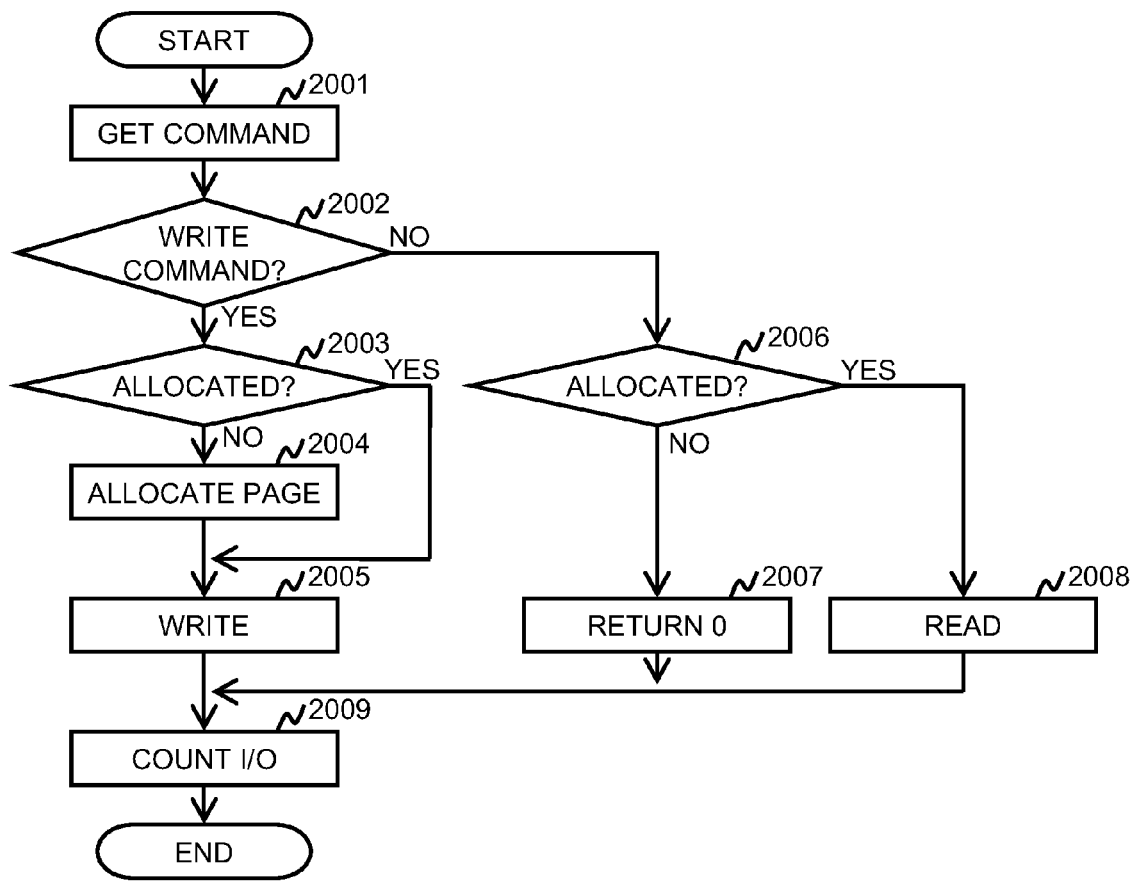
FIG. 20 is an example of a flow diagram illustrating a process of the disk control program for receiving an I/O command and sending the result of the I/O in reply.

FIG. 20 is an example of a flow diagram showing that the disk control program 501 receives the read command 1500 or the write command 1600 from the application program 402, and the disk control program 501 sends the result of read or write to the application program 402. In step 2001, the disk control program 501 receives the read command 1500 or the write command 1600 from the application program 402. In decision step 2002, if the command that the disk control program 501 received in step 2001 is the write command 1600, then the process goes to decision step 2003; if not, then the process goes to decision step 2006. In decision step 2003, if an area specified by the volume name 1602 and the volume address 1603 of the write command 1600 is allocated in the virtual volume information 505, then the process goes to step 2005; if not, then the process goes to step 2004. In step 2004, the disk control program 501 allocates an unallocated area of a logical volume for which the media type is specified by the default tier 1205 in the tier definition information 506 and which is comprised in the pool that has the volume specified by the volume name 1602 to an area specified by the volume name 1602 and the volume address 1603, and updates the virtual volume information 505. In step 2005, the disk control program 501 gets the volume name 1602 and the volume address 1603 from the write command 1600, gets the logical volume name 1105 and the logical volume address 1106 from the virtual volume information 505, gets the RAID group name 903 and the RAID group address 904 from the logical volume information 503, and writes the data 1604 in the write command 1600 to the area specified by the RAID group name 903 and the RAID group address 904. In decision step 2006, if an area specified by the volume name 1502 and the volume address 1503 of the read command 1500 is allocated in the virtual volume information 505, then the process goes to step 2008; if not, then the process goes to step 2007. In step 2007, the disk control program 501 returns "0" to the application server 300 because the area specified by the volume name 1502 and the volume address 1503 is not written. In step 2008, the disk control program 501 gets the volume name 1502 and the volume address 1503 from the read command 1500, gets the logical volume name 1105 and the logical volume address 1106 from the virtual volume information 505, gets the RAID group name 903 and the RAID group address 904 from the logical volume information 503, reads the area specified by the RAID group name 903 and the RAID group address 904, and returns the data. In step 2009, if the command that the disk control program 501 received in step 2001 is the write command 1600, then the disk control program 501 increments the number of access 1107 of the row specified by the volume name 1602 and the volume address 1603 in the write command 1600 by "1"; if not, then the disk control program 501 increments the number of access 1107 of the row specified by the volume name 1502 and the volume address 1503 in the read command 1500 by "1."

Figure 21:
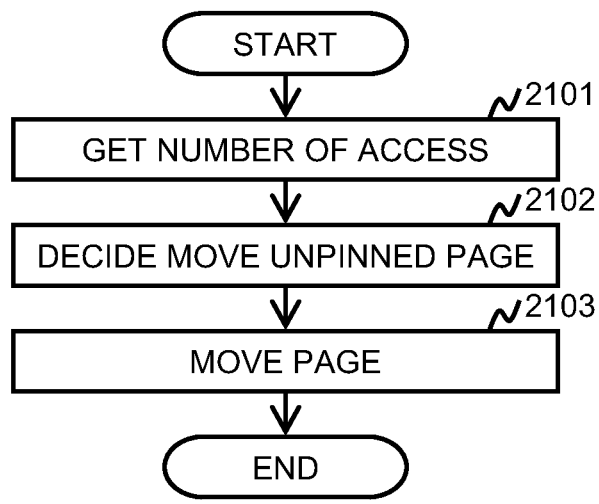
FIG. 21 is an example of a flow diagram illustrating a process of the page move program for moving pages.

FIG. 21 is an example of a flow diagram illustrating a process of the page move program 507 for moving pages. The page move program 507 regularly moves frequently accessed pages to a higher tier and rarely accessed pages to a lower tier. In this embodiment, as defined in the tier definition information 506, there are three tiers, where tier 1 is the highest tier and tier 3 is the lowest tier. In step 2101, the page move program 507 gets the number of access 1107 from the virtual volume information 505. In step 2102, the page move program 507 calculates the capacity in each tier based on the RAID group information 502, the logical volume information 503, and the storage pool information 504, assigns pages in decreasing order to tiers in decreasing order except pages for which the pinned 1108 is checked, and decides pages that should be moved to another tier. In step 2103, the page move program 507 moves the pages that it decided to move in step 2102 to the tier specified in step 2102, and updates the virtual volume information 505.

Figure 22:
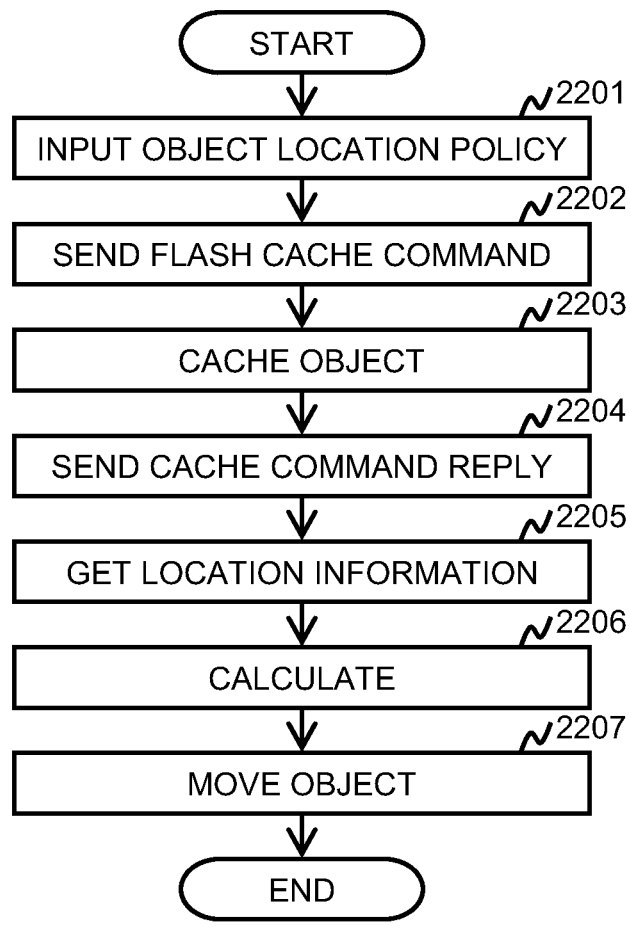
FIG. 22 is an example of a flow diagram illustrating a process of the location management program for moving data based on input from an administrator in the first embodiment.

FIG. 22 is an example of a flow diagram illustrating a process of the location management program 602 for moving data when an administrator inputs the object location policy information 603 with the object location policy information input screen 604 in the first embodiment. In step 2201, an administrator inputs the object location policy information 603 with the object location policy information input screen 604. In step 2202, the location management program 602 sends the flash cache command 1700 wherein the object name 1702 is for objects for which the data location 1302 is "SERVER FLASH" and the flash cache 1703 is "ON" to the application server 300. In step 2203, the application program 402 reads the objects specified by the flash cache command 1700, and writes the objects to the flash memory drive 306 in order to cache the objects to the flash memory drive 306. In step 2204, the application program 402 sends the flash cache command reply 1800 wherein the object name 1802 is for cached objects in step 1703 and the status 1803 is "CACHED." In step 2205, the information acquisition program 601 gets the object location information 403 from the application server 300. In step 2206, the location management program 602 gets the names of objects for which the data location 1302 is not "AUTO" in the object location policy information 603 and gets the page number that stores data of the objects from the object location information 403 and the virtual volume information 505. In step 2207, the location management program 602 sends the page pin command 1900 wherein the page name 1902 is for the pages obtained in step 2206 and the tier 1903 is the tier specified by the object location policy information 603 if the data location 1302 is "TIER 1," "TIER 2," or "TIER 3" or the tier 1903 is a lower tier such as, for example, "TIER 3" if the data location 1302 is "SERVER FLASH." Because flash memory drive and SSD are much faster and more expensive than SAS HDD and SATA HDD, an object that cached on the flash memory drive 306 should be moved to a lower tier such as "TIER 2" or "TIER 3." If the data location 1302 is "SERVER FLASH," the cache 1904 is "NO"; if not, the cache 1904 is "YES."

Second Embodiment

Figure 23:
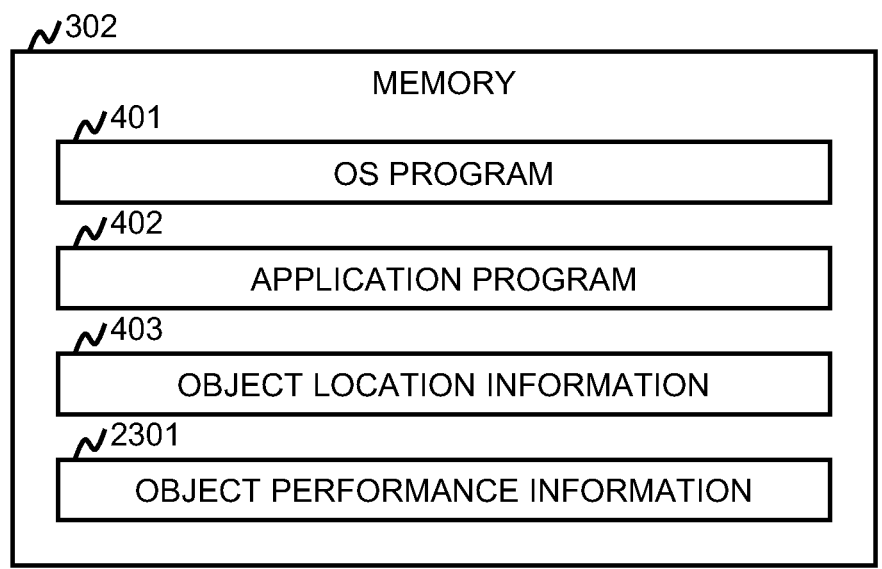
FIG. 23 illustrates an example of the memory in the application server of FIG. 3 according to a second embodiment.

FIG. 23 illustrates an example of the memory 302 in the application server 300 of FIG. 3 according to a second embodiment. The memory 302 comprises the OS (Operating System) program 401, the application program 402, the object location information 403, and object performance information 2301 (which is not in the first embodiment of FIG. 4).

Figure 24:
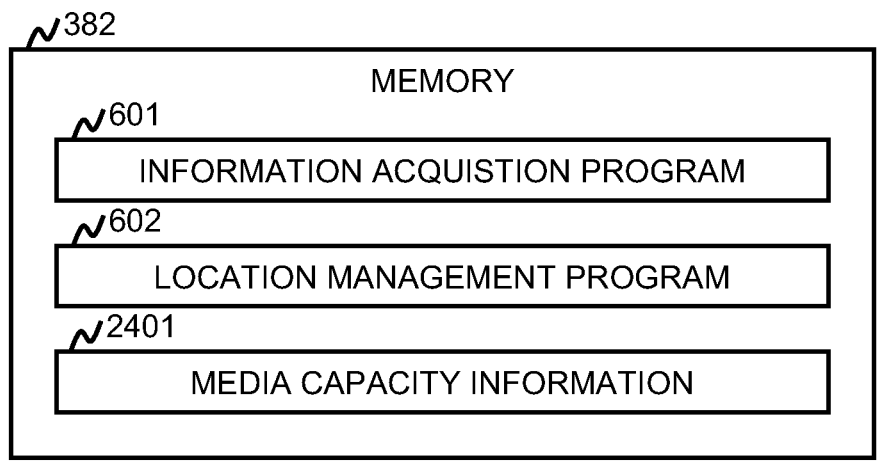
FIG. 24 illustrates an example of the memory in the management server of FIG. 3 according to the second embodiment.

FIG. 24 illustrates an example of the memory 382 in the management server 380 of FIG. 3 according to the second embodiment. The memory 382 comprises the information acquisition program 601, the location management program 602, and media capacity information 2401 (instead of the object location policy information 603 and object location policy information input screen 604 in the first embodiment of FIG. 6).

FIG. 25 shows an example of the object performance information 2301 in the second embodiment. The object performance information 2301 includes columns of object name 2501, object size 2502, number of I/O 2503, and I/O per object size 2504. The object size 2502 shows the size of the object specified by the object name 2501. The number of I/O 2503 shows the number of I/O per second to the object specified by the object name 2501. The I/O per object size 2504 shows an I/O density that is a quotient of the number of I/O 2503 divided by the object size 2502. Examples for Object A, Object B, and Object C are shown in rows 2505, 2506, and 2507.

FIG. 26 shows an example of the media capacity information 2401 in the second embodiment. The media capacity information 2401 includes columns of media name 2601 and capacity 2602. The capacity 2602 shows a capacity of a media specified by the media name 2601. Examples for Tier 1, Tier 2, Tier 3, and Server Flash are shown in rows 2603, 2604, 2605, and 2606. "TIER 1," "TIER 2," and "TIER 3" each show a capacity in the storage subsystem 360 and "SERVER FLASH" shows a capacity of the flash memory drive 306.

Figure 27:
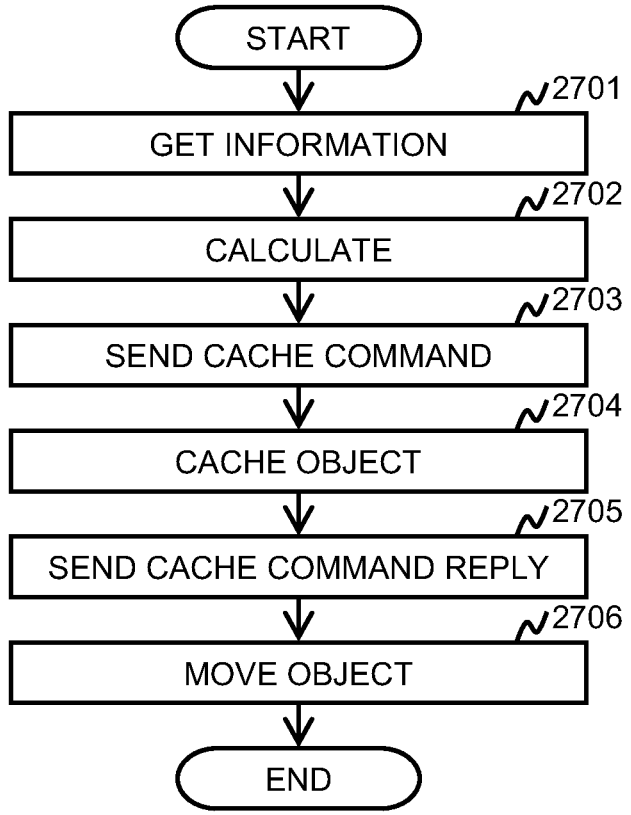
FIG. 27 is an example of a flow diagram illustrating a process of the location management program for moving data based on the number of I/O to each object in the second embodiment.

FIG. 27 is an example of a flow diagram illustrating a process of the location management program 602 for moving data based on the number of I/O to each object in the second embodiment. This flow is executed regularly, for example, every hour or every day. In step 2701, the information acquisition program 601 gets the object location information 403 and the object performance information 2301 from the application server 300. In step 2702, the location management program 602 calculates data locations of each object. The most accessed objects are cached on the flash memory drive 306 and moved to a lower tier while there is free space on the flash memory drive 306. The other objects are moved to a higher tier in descending order according to the I/O per object size 2504. The location management program 602 calculates destination tiers of each page based on the I/O per object size 2504 and the object location information 403. In step 2703, the location management program 602 sends the flash cache command 1700 wherein the object name 1702 is for objects that are determined to cache in step 2702. In step 2704, the application program 402 reads the objects specified by the flash cache command 1700 and writes the objects to the flash memory drive 306 in order to cache the objects to the flash memory drive 306. In step 2705, the application program 402 sends the flash cache command reply 1800 wherein the object name 1802 is for cached objects in step 1703 and the status 1803 is "CACHED." In step 2706, the location management program 602 sends the page pin command 1900 wherein the page name 1902 is for the pages gotten in step 2702 and the tier 1903 is the tier gotten in step 2702.

Third Embodiment

Figure 28:
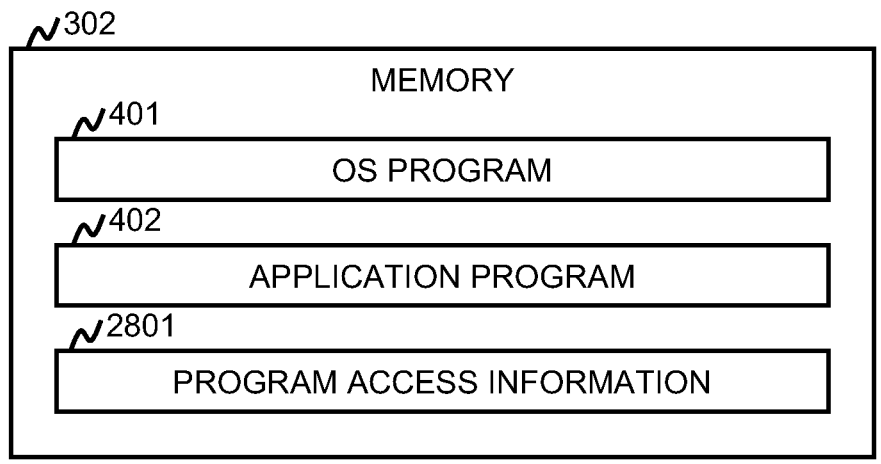
FIG. 28 illustrates an example of the memory in the application server of FIG. 3 according to a third embodiment.

FIG. 28 illustrates an example of the memory 302 in the application server 300 of FIG. 3 according to a third embodiment. The memory 302 comprises the OS (Operating System) program 401, the application program 402, and program access information 2801.

Figure 29:
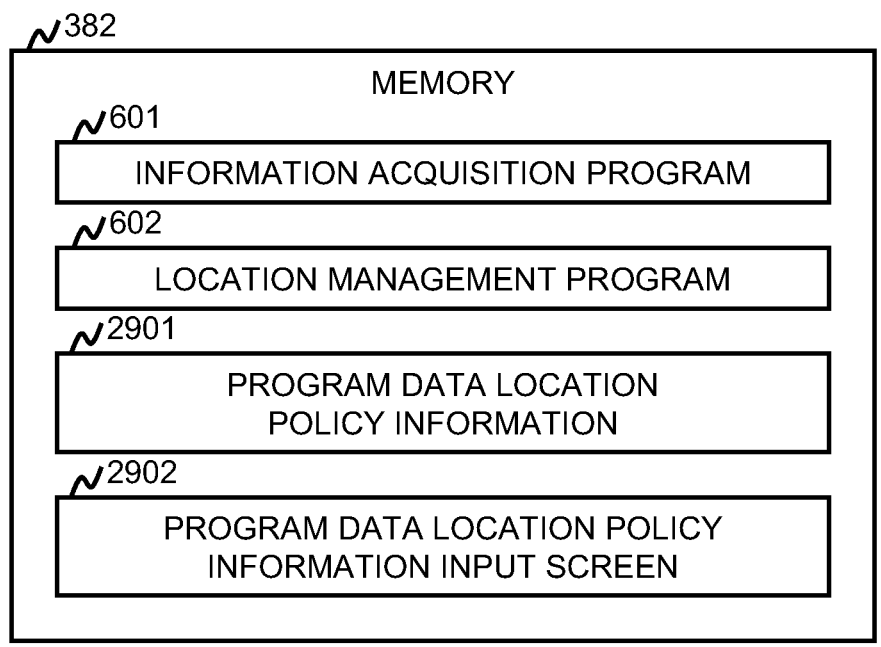
FIG. 29 illustrates an example of the memory in the management server of FIG. 3 according to the third embodiment.

FIG. 29 illustrates an example of the memory 382 in the management server 380 of FIG. 3 according to the third embodiment. The memory 382 comprises the information acquisition program 601, the location management program 602, program data location policy information 2901, and program data location policy information input screen 2902.

FIG. 30 shows an example of the program access information 2801 in the third embodiment. The program access information 2801 includes columns of program name 3001, volume name 3002, and volume address 3003. The program access information 2801 shows a program specified by the program name 3001 accessing an area specified by the volume name 3002 and the volume address 3003. Examples for Program A, Program B, and Program C are shown in rows 3004, 3005, and 3006.

FIG. 31 shows an example of the program data location policy information 2901 in the third embodiment. The program data location policy information 2901 includes columns of program name 3101 and data location 3102. The program data location policy information 2901 shows an area accessed by a program specified by the program name 3101 which should be located on a location specified by the data location 3102. Examples for Program A, Program B, and Program C are shown in rows 3103, 3104, and 3105.

FIG. 32 shows an example of the program data location policy information input screen 2902 in the third embodiment. The program data location policy information input screen 2902 includes a program name 3201, a data location 3202, an OK button 3203, and a cancel button 3204. An administrator inputs the data location 3202 of a program specified by the program name 3201 and clicks the OK button 3203.

Figure 33:
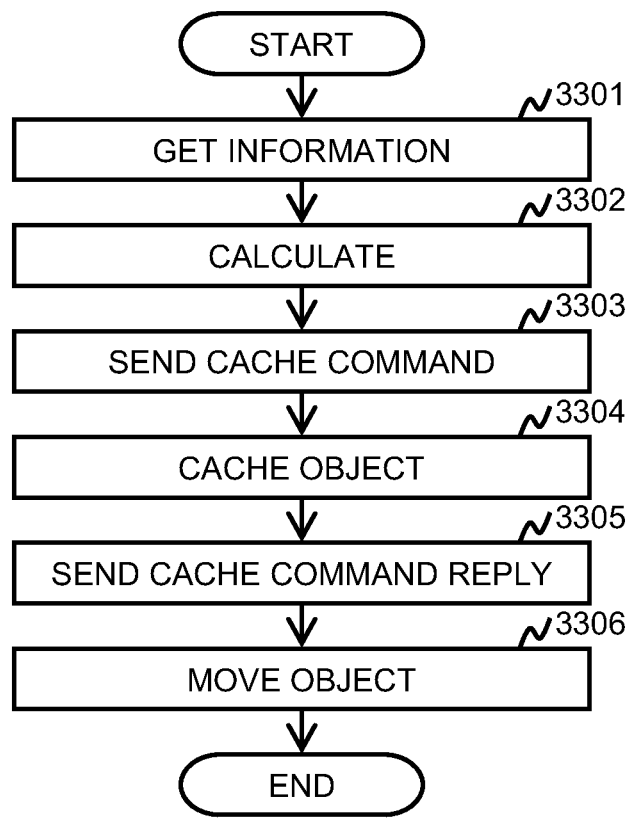
FIG. 33 is an example of a flow diagram illustrating a process of the location management program for moving data based on input from an administrator in the third embodiment.

FIG. 33 is an example of a flow diagram illustrating a process of the location management program 602 for moving data when an administrator inputs the program data location policy information 2901 with the program data location policy information input screen 2902 in the third embodiment. This flow is executed regularly, for example, every hour or every day. In step 3301, the information acquisition program 601 gets the program access information 2801 from the application server 300. In step 3302, the location management program 602 calculates destination locations of each page based on the virtual volume information 505, the program access information 2801, and the program data location policy information 2901. Pages accessed by programs at the data location 3102 include "SERVER FLASH" which should be cached on the flash memory drive 306 and moved to a lower tier. The other pages should be moved to tiers specified by the program data location policy information 2901. In step 3303, the location management program 602 sends the flash cache command 1700 wherein the object name 1702 is for an object that is determined to cache in step 3302. In step 3304, the application program 402 reads the objects specified by the flash cache command 1700 and writes the objects to the flash memory drive 306 in order to cache the objects to the flash memory drive 306. In step 3305, the application program 402 sends the flash cache command reply 1800 wherein the object name 1802 is for cached objects in step 3303 and the status 1803 is "CACHED." In step 3306, the location management program 602 sends the page pin command 1900 wherein the page name 1902 is for the pages gotten in step 3302 and the tier 1903 is the tier gotten in step 3302.

Fourth Embodiment

Figure 34:
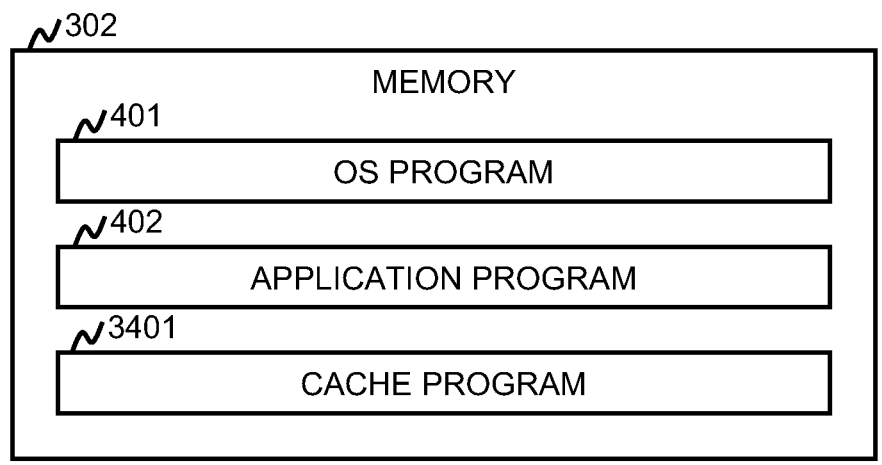
FIG. 34 illustrates an example of the memory in the application server of FIG. 3 according to a fourth embodiment.

FIG. 34 illustrates an example of the memory 302 in the application server 300 of FIG. 3 according to a fourth embodiment. The memory 302 comprises the OS (Operating System) program 401, the application program 402, and a cache program 3401.

Figure 35:
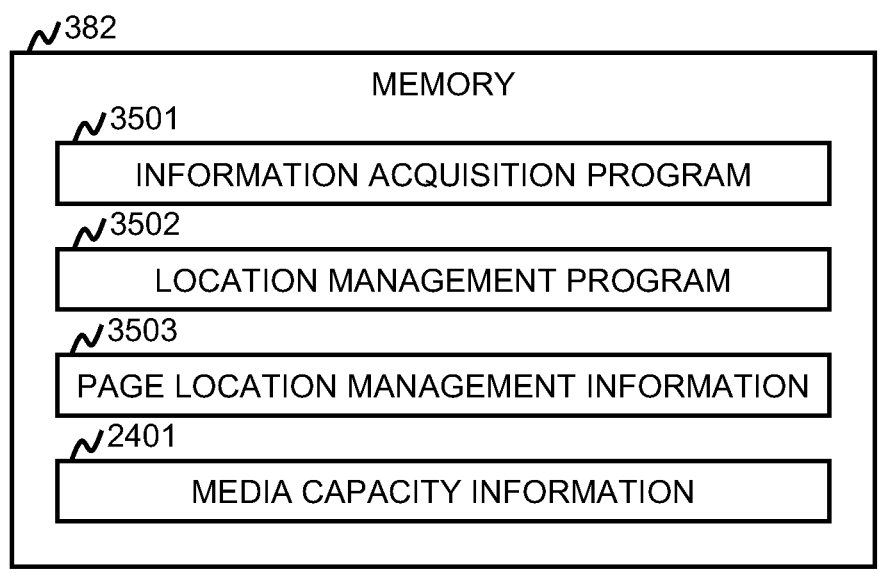
FIG. 35 illustrates an example of the memory in the management server of FIG. 3 according to the fourth embodiment.

FIG. 35 illustrates an example of the memory 382 in the management server 380 of FIG. 3 according to the fourth embodiment. The memory 382 comprises an information acquisition program 3501, a location management program 3502, page location management information 3503 (which are new in the fourth embodiment), and the media capacity information 2401 (which is the same as that in the second embodiment of FIG. 24).

FIG. 36 shows an example of page location management information 3503 in the fourth embodiment. The page location management information 3503 includes columns of page number 3601, number of access for 24 hours 3602, minimum data location 3603, number of access for 1 hour 3604, and data location 3605. The location management program 3502 gets the virtual volume information 505 and creates the page location management information 3503. The page number 3601 shows names of pages (as identified by page numbers, e.g., Page 0, Page 1, etc.). Examples for Page 0 to Page 9 are shown in rows 3606 to 3615. The number of access for 24 hours 3602 shows the number of access to a page specified by the page number 3601 for 24 hours from 0:00 AM yesterday to 0:00 AM today. The minimum data location 3603 shows locations of pages specified by the page number 3601. Pages are allocated on locations specified by the minimum data location 3603 or better locations. If minimum data location 3603 is "TIER 2," then "SERVER FLASH," "TIER 1," or "TIER 2" is allocated to the page. The location management program 3502 determines the minimum data location 3603 based on the number of access for 24 hours 3602 every 24 hours. The number of access for 1 hour 3604 shows the number of access to pages to a page specified by the page number 3601 for the last 1 hour. The location management program 3502 determines the data location 3605 based on the minimum data location 3603 and the number of access for 1 hour 3604 every 1 hour. Pages that have a larger number of access are allocated to a higher tier. Pages that have a smaller number of access are allocated to a lower tier and an equal to or higher tier than the minimum data location 3603.

FIG. 37 shows an example of a page flash cache command 3700 in the fourth embodiment. The page flash cache command 3700 includes command type 3701, page name 3702, and flash cache 3703. The location management program 3502 sends the page flash cache command 3600 to the application server 300 to cache pages and uncache pages on the flash cache drive 306. If the flash cache 3703 is "ON" (row 3704), the cache program 3401 caches pages specified by the page name 3702 to the flash memory drive 306. If the flash cache 3703 is "OFF" (row 3705), the cache program 3401 releases pages specified by the page name 3602 from the flash memory drive 306. When the application program 402 reads data if the cache program 3401 cached the data to the flash memory drive 306, the application program 402 reads the data not from the storage subsystem 360 but from the flash memory drive 306.

FIG. 38 shows an example of a page flash cache command reply 3800 in the fourth embodiment. The page flash cache command reply 3800 includes command type 3801, page name 3802, and status 3803. The cache program 3401 sends the page flash cache command reply 3800 to the management server 380 to provide in reply the result of the page flash cache command 3700. If the status 3803 is "CACHED" (row 3804), pages specified by the page name 3802 are cached on the flash memory drive 306. If the status 3803 is "UNCACHED" (row 3805), pages specified by the page name 3802 are not cached on the flash memory drive 306.

Figure 39:
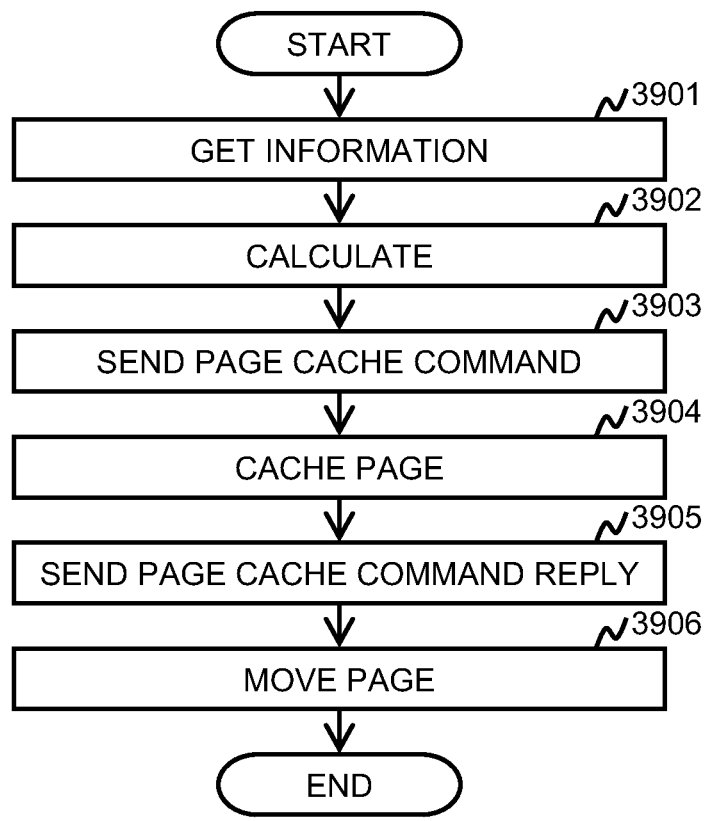
FIG. 39 is an example of a flow diagram illustrating a process of the location management program for moving data based on the number of access to pages in the fourth embodiment.

FIG. 39 is an example of a flow diagram illustrating a process of the location management program 3502 for moving data based on the number of access to pages in the fourth embodiment. This flow is executed every hour. In step 3901, the information acquisition program 3501 gets the virtual volume information 505 from the storage subsystem 360, updates the number of access for 1 hour 3604 in the page location management information 3503 every hour, and updates the number of access for 24 hours 3602 in the page location management information 3503 every 24 hours. In step 3902, the location management program 602 calculates the minimum data location 3603 and the data location 3605. If the location management program 602 updated the number of access for 24 hours 3602, the location management program 602 calculates the minimum data location 3603 based on the number of access for 24 hours and the media capacity information 2401. The location management program 3502 calculates the data location 3605 based on the number of access for 1 hour 3604 and the minimum data location 3603 and the media capacity information 2401. The location management program 3502 allocates the half capacity of each tier based on the number of access for 24 hours 3600 and the other half capacity of each tier based on the number of access for 1 hour 3604. In step 3903, the location management program 602 sends the page flash cache command 3700 wherein the page name 3702 is for a page that is determined to cache in step 3902. In step 3904, the application program reads the pages specified by the page flash cache command 3700 and writes the pages to the flash memory drive 306 in order to cache the pages to the flash memory drive 306. In step 3905, the application program 402 sends the page flash cache command reply 3800 wherein the page name 3802 is for cached pages in step 3903 and the status 3803 is "CACHED." In step 3906, the location management program 602 sends the page pin command 1900 wherein the page name 1902 is for the pages gotten in step 3902 and the tier 1903 is the tier gotten in step 3902.

Of course, the system configuration illustrated in FIG. 3 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for data location management. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A system comprising:
    a storage system operable to couple to a server and to manage a plurality of storage tiers, each of the plurality of storage tiers operable to store data sent from the server; and
    a management computer operable to manage storage of data in the storage system and to manage a storage tier of the plurality of storage tiers for storing data based on whether the data is stored in a cache memory in the server or not;
    wherein the management computer receives information which indicates whether data location of the data is AUTO or not and, if not AUTO, indicates a current tier of the data and whether the data is stored in the cache memory of the server;
    wherein if the information indicates that the data location is AUTO, frequently accessed data is moved to a higher tier and infrequently accessed data is moved to a lower tier; and
    wherein if the information indicates that the data location is not AUTO and the data is stored in the cache memory of the server, the management computer sends a command to the storage system to request that the data be moved from the current tier to a lower tier of the storage system which is lower than the current tier.

2. The system according to claim 1,
    wherein the storage system comprises a storage controller to manage storage of a data at a location selected among the plurality of storage tiers based on a location policy for the data.

3. The system according to claim 1,
    wherein a higher tier has higher speed storage media than a lower tier.

4. The system according to claim 3,
    wherein the storage system is configured to manage the plurality of storage tiers for storing data objects;
    wherein the management computer is configured to manage storage of data objects in the storage system; and
    wherein if data of a data object is stored in the cache memory of the server, the data object is to be stored in the lower tier of the storage system.

5. The system according to claim 3,
    wherein the management computer is operable, if a data is stored in the cache memory of the server, to pin the data to be stored in the lower tier of the storage system; and
    wherein the storage system comprises a storage controller which is configured, if a data is not stored in the cache memory of the server, to manage storage of the data at a location selected among the plurality of storage tiers based on a preset location policy for the data.

6. The system according to claim 3,
    wherein the storage system is configured to manage the plurality of storage tiers for storing data objects;
    wherein the management computer is operable, if a data object is stored in the cache memory of the server, to pin the data object to be stored in the lower tier of the storage system; and
    wherein the storage system comprises a storage controller which is configured, if a data object is not stored in the cache memory of the server, to manage storage of the data object at a location selected among the plurality of storage tiers based on a number of access to the data object.

7. The system according to claim 3,
    wherein the management computer is operable, if a data is stored in the cache memory of the server, to pin the data to be stored in the lower tier of the storage system; and
    wherein the storage system comprises a storage controller which is configured, if a data is not stored in the cache memory of the server, to manage storage of the data at a location selected among the plurality of storage tiers based on a program data location policy that specifies tier selection for data location depending upon which computer program of a plurality of computer programs accesses the data.

8. The system according to claim 3,
    wherein the storage system is configured to manage the plurality of storage tiers for storing data in volume pages;
    wherein the management computer is operable, if a volume page is stored in the cache memory of the server, to pin the volume page to be stored in the lower tier of the storage system; and
    wherein the storage system comprises a storage controller which is configured, if a volume page is not stored in the cache memory of the server, to manage storage of the volume page at a location selected among the plurality of storage tiers based on a number of access to the volume page.

9. A management computer for managing storage of data in a storage system which is coupled to a server and which manages a plurality of storage tiers, each of the plurality of storage tiers operable to store data sent from the server, the management computer comprising:
    a processor;
    a memory; and
    a module to manage storage of data in the storage system and to manage a storage tier of the plurality of storage tiers for storing data based on whether the data is stored in a cache memory in the server or not;
    wherein the module receives information which indicates Whether data location of the data is AUTO or not and, if not AUTO, indicates a current tier of the data and whether the data is stored in the cache memory of the server;
    wherein if the information indicates that the data location is AUTO, frequently accessed data is moved to a higher tier and infrequently accessed data is moved to a lower tier; and
    wherein if the data information indicates that the data location is not AUTO and the data is stored in the cache memory of the server, the module sends a command to the storage system to request that the data be moved from the current tier to a lower tier of the storage system which is lower than the current tier.

10. The management computer according to claim 9,
    wherein the module is configured to receive input of a location policy and to manage storage of a data in the storage system at a location selected among the plurality of storage tiers based on the location policy for the data.

11. The management computer according to claim 9,
    wherein the module is configured to send a command to the server to check a status of the cache memory of the server and determine if any data that is to be stored in the storage system is stored in the cache memory.

12. The management computer according to claim 9, wherein a higher tier has higher speed storage media than a lower tier.

13. A non-transitory computer-readable storage medium storing a plurality of instructions for controlling a data processor to manage storage of data in a storage system which is coupled to a server and which manages a plurality of storage tiers, each of the plurality of storage tiers operable to store data sent from the server, the plurality of instructions comprising:
- instructions that cause the data processor to manage a storage tier of the plurality of storage tiers for storing data based on whether the data is stored in a cache memory in the server or not;
- wherein the instructions that cause the data processor to manage a storage tier of the plurality of storage tiers for storing data comprise instructions that cause the data processor to manage storage of data in the storage system;
- instructions that cause the data processor to receive information which indicates whether data location of the data is AUTO or not and, if not AUTO, indicates a current tier of the data and whether the data is stored in the cache memory of the server;
- wherein if the information indicates that the data location is AUTO, frequently accessed data is moved to a higher tier and infrequently accessed data is moved to a lower tier; and
- instructions that cause the data processor, if the information indicates that the data location is not AUTO and the data is stored in the cache memory of the server, to send a command to the storage system to request that the data be moved from the current tier to a lower tier of the storage system which is lower than the current tier.

14. The non-transitory computer-readable storage medium according to claim 13, wherein the plurality of instructions further comprise:
- instructions that cause the data processor to provide a user interface to receive input of a location policy; and
- instructions that cause the data processor to manage storage of a data in the storage system at a location selected among the plurality of storage tiers based on the location policy for the data.

15. The non-transitory computer-readable storage medium according to claim 13, wherein a higher tier has higher speed storage media than a lower tier.

16. The non-transitory computer-readable storage medium according to claim 15, wherein the instructions that cause the data processor to manage storage of data in the storage system comprise:
- instructions that cause the data processor, if a data is stored in the cache memory of the server, to pin the data to be stored in the lower tier of the storage system; and
- instructions that cause the data processor, if a data is not stored in the cache memory of the server, to manage storage of the data at a location selected among the plurality of storage tiers based on a preset location policy for the data.

17. The non-transitory computer-readable storage medium according to claim 15, wherein the instructions that cause the data processor to manage storage of data in the storage system comprise:
- instructions that cause the data processor, if a data object is stored in the cache memory of the server, to pin the data object to be stored in the lower tier of the storage system; and
- instructions that cause the data processor, if a data object is not stored in the cache memory of the server, to manage storage of the data object at a location selected among the plurality of storage tiers based on a number of access to the data object.

18. The non-transitory computer-readable storage medium according to claim 15, wherein the instructions that cause the data processor to manage storage of data in the storage system comprise:
- instructions that cause the data processor, if a data is stored in the cache memory of the server, to pin the data to be stored in the lower tier of the storage system; and
- instructions that cause the data processor, if a data is not stored in the cache memory of the server, to manage storage of the data at a location selected among the plurality of storage tiers based on a program data location policy that specifies tier selection for data location depending upon which computer program of a plurality of computer programs accesses the data.

19. The non-transitory computer-readable storage medium according to claim 15, wherein the data is stored in volume pages in the storage system, and wherein the instructions that cause the data processor to manage storage of data in the storage system comprise:
- instructions that cause the data processor, if a volume page is stored in the cache memory of the server, to pin the volume page to be stored in the lower tier of the storage system; and
- instructions that cause the data processor, if a volume page is not stored in the cache memory of the server, to manage storage of the volume page at a location selected among the plurality of storage tiers based on a number of access to the volume page.

20. The non-transitory computer-readable storage medium according to claim 15, wherein the storage system is configured to manage the plurality of storage tiers for storing data objects, and wherein the instructions that cause the data processor to manage storage of data in the storage system comprise:
- instructions that cause the data processor to manage storage of data objects in the storage system; and
- instructions that cause the data processor, if data of a data object is stored in the cache memory of the server, to store the data object in the lower tier of the storage system.

* * * * *